United States Patent [19]

Cook

[11] 4,373,554
[45] Feb. 15, 1983

[54] SELF-SEALING ARTICLE AND PROCESS
[75] Inventor: Paul M. Cook, Atherton, Calif.
[73] Assignee: Raychem Corporation, Menlo Park, Calif.
[21] Appl. No.: 462,120
[22] Filed: Apr. 18, 1974

Related U.S. Application Data

[63] Continuation-in-part of Ser. No. 228,300, Oct. 4, 1962, abandoned, and a continuation-in-part of Ser. No. 58,401, Jul. 27, 1970, abandoned.

[51] Int. Cl.³ ............................................. F16L 11/12
[52] U.S. Cl. ..................................... 138/137; 138/98; 138/178; 428/36; 428/913; 174/DIG. 8
[58] Field of Search .............. 138/137, 140, 141, 177, 138/178, 89, 97, 98; 174/DIG. 8; 428/36, 913

[56] References Cited
U.S. PATENT DOCUMENTS 2,867,241  1/1959  Harris ............................. 138/137 X
2,918,394 12/1959  Smith .............................. 138/137 X
2,932,323  4/1960  Aries ................................... 138/137
3,022,543  2/1962  Baird et al. .................... 117/138.8 E
3,033,238  5/1962  Kosewicz ............................ 138/141
3,115,164 12/1963  Vanderbilt ...................... 138/137 X
3,184,358  5/1965  Utz ..................................... 156/244
3,243,211  3/1966  Wetmore ............................ 138/178
3,297,819  1/1967  Wetmore ........................ 138/137 X
3,491,799  1/1970  Foll ................................. 138/141 X
3,542,077 11/1970  Muchmore ..................... 138/178 X
3,600,487  8/1971  Zavasnik ........................ 138/137 X
3,669,824  6/1972  Hess ................................ 161/402 X Primary Examiner—James E. Bryant, III
Attorney, Agent, or Firm—Lyon & Lyon

[57] ABSTRACT

A heat recoverable article comprising a recoverable portion and a fusible portion integrally formed so that on heating to recover the recoverable portion, the fusible portion can fuse. The article is especially suitable for encapsulating electrical connections.

13 Claims, 3 Drawing Figures

SELF-SEALING ARTICLE AND PROCESS

This is a continuation-in-part of Application, Ser. No. 228,300, filed Oct. 4, 1962, now abandoned and Application Ser. No. 58,401, filed July 27, 1970, now abandoned.

The present invention relates to self-sealing articles which are essentially integral and the process of producing such articles. More particularly, the present invention relates to self-sealing articles which are essentially integral and which possess the property of elastic (or plastic) memory in which one portion thereof is relatively infusible and another portion thereof is relatively fusible.

As used herein, the term, "essentially integral" is intended to include, in addition to articles, two portions of which have substantially the same chemical composition, articles formed from two portions of different chemical composition which, when joined together in the necessary manner, form a bond so intimate that the joined product is fundamentally a single integral structure. It is apparent that in order for such an intimate bond to be obtained, the materials which are joined together must have a high degree of compatibility and must be joined together by a procedure which permits achievement of the intimate bond. For example, such a bond may be obtained by fusing two materials, for example, by joining polyethylene and polypropylene together when these materials are in the fluid (molten) or semi-fluid state. It is also within the scope of the present invention to produce such an intimate bond such as a chemical bond by suitable chemical means as by an adhesive.

Elastic memory properties may be imparted to the relatively infusible portion of the article of the present invention by any suitable method. As is well known to those skilled in the art, articles possessing elastic memory are those articles which have been deformed from an original configuration and which are capable of changing dimension upon the application of heat to regain the original configuration. According to one well-known procedure for producing elastic memory articles, a polymeric material is first extruded or otherwise molded into a desirable shape. The polymeric material is then cross-linked by exposure to ultra-violet radiation or high energy radiation, e.g., a high energy electron beam or atomic pile radiation, or by chemical means, e.g., peroxides when polyolefins are used. In the case of materials such as polyvinyl chloride and polytetrafluoroethylene, the cross-linking step is not required. The cross-linked polymeric material is then heated and deformed, and then locked in the deformed condition by quenching or other suitable cooling means or, in the alternative, the same process may be accomplished at room temperature by using greater force to deform the polymeric material. The deformed material will retain its shape almost indefinitely until exposed to a temperature above its crystalline melting temperature, e.g., approximately 250° F. in the case of polyethylene. Another well-known method for producing elastic memory articles is that disclosed in Currie U.S. Pat. Nos. 2,027,961 and 2,027,962. Still another method of producing elastic memory articles is disclosed in U.S. Pat. No. 3,086,242, the disclosure of which is incorporated by reference herein. Among the materials which may be used in the present invention are heat recoverable elastomeric materials such as modified silicone rubber, modified neoprene rubber, such as those referred to in the copending application of Cook, Ser. No. 65,953, filed Oct. 31, 1960 now U.S. Pat. No. 3,597,370. Thus, in general, any material possessing the property of elastic memory (sometimes referred to as plastic memory), may be used in the practice of the present invention.

The relatively infusible portion of the article of the present invention may be rendered relatively infusible by cross-linking, e.g., by radiation or chemical means.

It is a principal object of the present invention to provide an essentially integral self-sealing article and the process of producing such an article.

It is another object of the present invention to provide an essentially integral self-sealing article comprising a relatively fusible portion and a relatively infusible portion wherein the article possesses the property of elastic memory and the process of producing such an article.

A further object of the present invention is to provide an essentially integral self-sealing heat recoverable article having elastic memory which is capable of being laminated or otherwise united with another article in such a manner that a secure, intimate and impervious bond is formed in the process of so doing.

A further object of the present invention is to provide a method of insulating and sealing electrical connections in a simple, inexpensive manner.

Other objects and advantages of the present invention will become apparent from the following detailed description, when read in conjunction with the drawings, of preferred embodiments of the present invention.

Briefly, the present invention comprises an essentially integral self-sealing article having the property of elastic memory which comprises a relatively fusible portion and a relatively infusible portion and the process of making such an article.

The relatively fusible and infusible portions of the article of the present invention are joined together in such a manner that the resulting article is essentially integral. Thus, in a preferred embodiment, these portions are united by compound extrusion before the portion which is to be relatively infusible has acquired this property. The article is then treated, e.g., by radiation or chemical means, to cross-link a portion of the article to render this portion relatively infusible. Thus, according to this embodiment, the property of elastic memory is imparted to at least the relatively infusible portion. It is preferred to extrude the article as a tube, irradiate the tube, expand the tube, and quench the tube while expanded. The flat sheet may, of course, be extruded as such or may be produced by slitting an extruded tube. Furthermore, the article of the present invention may be produced by molding rather than by extruding. In another embodiment of the present invention, the relatively infusible material may comprise a very high molecular weight material which has gel strength and which has the property of elastic memory, e.g., polytetrafluoroethylene. It is also within the scope of the present invention to provide the homogeneous article with a reinforcing material such as a braid or knit fabric. The relatively fusible portion of the article of the present invention may comprise one exterior surface of the article or may comprise as much as the entire exterior surface of the article. In the case of tubular articles, the relatively fusible portion may comprise the inner or outer exterior surface or both. The article of the present invention may then be used for any desired laminating, encapsulating, covering or similar purpose by positioning it in such relation with the article to which it is to be laminated or otherwise united that the application of heat will cause the article of the present invention to change its dimensions such that the relatively fusible portion thereof is urged toward the article to which it is to be attached and cause it to become bonded thereto. Such a process forms a part of the present invention. If necessary, the article of the present invention is then subjected to sufficient heat to cause the relatively fusible portion to become fluid. A secure, intimate and impervious bond is thus formed between the article of the present invention and the article to which it is attached. The article of the present invention may be formed in a shape which corresponds to the shape of the article to which it is to be attached or the article of the present invention may simply comprise a tape which may be wound around another article.

Figure 1:
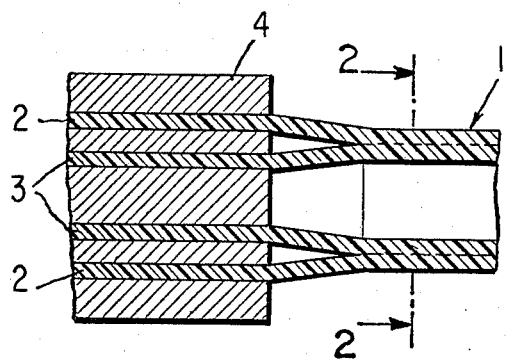
FIG. 1 illustrates an embodiment of the present invention in which the article of the present invention is formed by compound extrusion in tubular form.

Referring now to the drawings, FIG. 1 illustrates one embodiment of the present invention wherein an essentially integral article 1 is formed by compound extrusion of polymeric materials 2 and 3 in tubular form. Extruder 4 is illustrated diagrammatically and may be of any suitable type.

Figure 2:
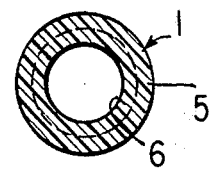
FIG. 2 illustrates the product produced according to the procedure illustrated in FIG. 1.

FIG. 2 illustrates the product 1 which is produced according to the procedure illustrated in FIG. 1 which, although it is essentially integral, comprises portions 5 and 6 which have different characteristics. For the purposes of this description, portion 5 will be considered to be the relatively infusible portion and portion 6 will be considered to be the relatively fusible portion. However, it is to be understood that the relatively fusible portion could comprise the inner surface, the outer surface, or both.

In the preferred embodiment of the present invention, relatively infusible portion 5 is rendered such by cross-linking, preferably by irradiation. Since the irradiation is performed after the formation of essentially integral article 1, it is necessary that relatively infusible portion 5 be capable of being cross-linked by a radiation dose which is insufficient to cross-link portion 6 to the point where it would be rendered infusible. This may be achieved by various methods. One such method is to control the initial molecular weight and/or molecular weight distribution such that the subsequent irradiation does not cross-link portion 6 to the point where it is infusible.

For example, it is known that both molecular weight and molecular weight distribution have a vast influence on the dose-to-infusibility of polyethylene, as disclosed by Lawton et al, Ind. Eng. Chem., 46, 1703 (1954). Thus, the desired cross-linking properties of portions 5 and 6 may be achieved by manipulation of these molecular weight characteristics when polyethylene is used. Practical limits, expressed in terms of melt index, on the molecular weight of polyethylene are as follows: relatively infusible portion about 0.3 or lower; relatively fusible portion about 20 or higher.

Antirads may also be used to control infusibility. These materials, when incorporated into polymers function by chemical means to prevent cross-linking of the polymers, e.g., by free radical reactions. Some thermal anti-oxidants for olefin polymers function as strong antirads. Thus, the incorporation of a thermal anti-oxidant in the relatively fusible portion 6 serves the dual function of preventing this portion from reaching the infusibility point during irradiation and also serves to protect the polymer against thermal degradation. Of course, other materials which are not anti-oxidants function as antirads. An example of a thermal anti-oxidant antirad for polyolefins is 4, 4'-thiobis-(6-tert-butyl-m-cresol). Other examples are: 4, 4' methylenebis-(2-tert-butylphenol); 2-6, ditert-butylphenol; 4, 4' butylidenebis-(6-tert-butyl-m-cresol) 2, 5-di (t-amyl) hydroquinone. Example of antirads which are not anti-oxidants are: pentabromophenol, naphthylene, copper and stearate.

Antirads and their function are well-known, see e.g., Charlesby, *Atomic Radiation and Polymers* (1960). Thus, when an antirad is present in the fusible polymeric layer, irradiation of that layer does not result in the formation of a substantial number of cross-links between polymer molecules, i.e., there is no substantial alteration in polymer properties including flowability of the polymer. Thus, in the article of this invention, the inner fusible layer, if it contained antirads prior to radiation, contains a product which characterized as not containing a substantial number of cross-links between polymer molecules and remaining substantially fusible or flowable.

Among the various polymeric materials which may be used to accomplish the objects of the present invention are polyethylene, polypropylene, nylon, fluorinated ethylene propylene, polyvinyl chloride and polyvinylidene fluoride and acrylic polymers and interpolymers of any of the foregoing with minor amounts of other ethylinically unsaturated monomers. In general, all polymeric materials capable of being cross-linked either by irradiation or chemical means and capable of forming an elastic memory material may be employed to form relatively infusible portion 5. In addition, very high molecular weight materials which have strength above the crystalline melting temperature and which are capable of possessing elastic memory material may be employed to form relatively infusible portion 5. In addition, very high molecular weight materials which have strength above the crystalline melting temperature and which are capable of possessing elastic memory may also be used.

Furthermore, combinations of materials may be used to form the article of the present invention. It is essential that the combined materials be capable of forming such an intimate bond with each other that an essentially integral article may be produced. For example, polyethylene and polypropylene may be used together.

The relatively infusible portion of the article of the present invention is, in general, produced in a means similar to the relatively fusible portion except that the relatively infusible portion comprises a material which reaches the infusibility point at radiation doses insufficient to cause the relatively fusible portion to lose the property of fusibility. Thus, a material having a higher molecular weight than the relatively fusible portion may be used, or cross-linking agents such as polymerizable comonomers may be added to the relatively infusible portion. Examples of such cross-linking agents are:

divinyl benzene, polybutadiene, allyl methacrylate, divinyl succinate, ethylene glycol diacrylate, diallyl fumarate, triallyl phosphate and triallyl cyanurate or isocyanurate. These cross-linking agents promote cross-linking at low radiation doses in the relatively infusible portion, particularly when polyolefins and polyvinyl halides are used.

Of course, it is recognized that there are many cross-linking agents which would be readily apparent to those skilled in the art. Thus, the term cross-linking agent is a well recognized term in the art and includes polyfunctional unsaturated monomers capable of enhancing cross-linking and those skilled in the art are aware of suitable cross-linking agents as indicated by the following: Lyons, *Nature* 604–06 (1960), Odian, *A Study of the Mechanism of Radiation-Induced Gelatin in Monomer-Polymer Mixtures* NYO 2481 (1961) and NYO 9829 (1961).

It is thus clear that a relatively fusible layer can comprise any polymeric material which, when the article of the invention is irradiated, does not become substantially cross-linked and thus remains relatively fusible. Fusibility can of course, be maintained by the use of antirads or molecular weight selection as set forth above. However, any material which will not cross-link and become relatively infusible upon being exposed to ionizing irradiation may be used. Thus, it is clear that materials such as polyisobutylene and polymethylmethacrylate which tend to degrade rather than cross-linking upon the exposure to ionizing radiation may be successfully used.

Thus, it will be apparent to those skilled in the art that by the use of an antirad and/or control of molecular weight in the relatively fusible portion, and/or by use of a cross-linking agent and/or control of molecular weight in the relatively infusible portion, it is possible to produce an article which, although it is essentially integral, possesses different melting characteristics in different portions. The relatively fusible portion will then function to form a secure, impervious and intimate bond with an article to which the article of the present invention is attached upon the application of sufficient heat and the relatively infusible portion of the present invention will function as a strong and intimately bonded covering or support. It is, of course, also possible to incorporate into the relatively fusible portion, the relatively infusible portion, or both, fillers, flame retardants, etc., as may be desired for a particular purpose. Furthermore, it is possible to obtain additional high temperature strength and/or chemical bonding by coating or with incorporating into the relatively fusible portion of the article of the present invention a material capable of chemically cross-linking or vulcanizing the relatively fusible portion which will function to cross-link this portion when the article is heated to cause it to bond to another article.

Figure 3:
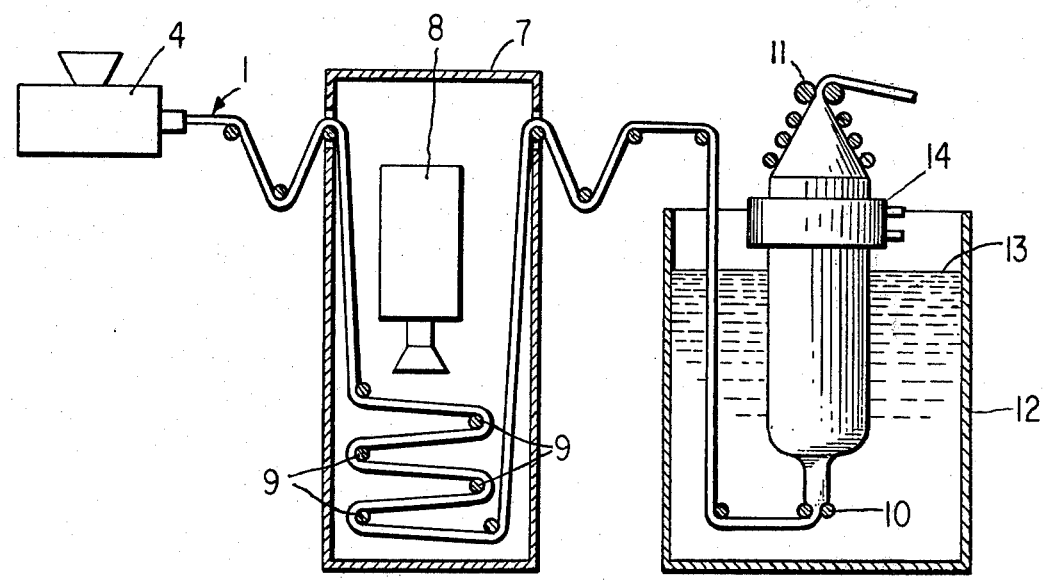
FIG. 3 illustrates diagrammatically the embodiment of the present invention wherein the article of the present invention is extruded in tubular form, irradiated, expanded and quenched to impart the property of elastic memory.

Referring now to FIG. 3, one embodiment of the process of the present invention is illustrated in diagrammatic form. In this drawing, the essentially integral article is extruded from compound extruder 4, and is then passed into chamber 7 which houses an electron generator 8. Rollers 9 cause the extruded article to pass through the electron beam of generator 8. This generator may be a two million electron volt Van der Graaff electron accelerator. When polyethylene is used, the radiation dosage may be varied from 5 to 15 megarads depending on the characteristics of the material.

After irradiation, the article passes to the expanding apparatus. In this apparatus, the article is fed through feedrolls 10 to a pair of deflator rolls 11. Tank 12 of this apparatus contains heating medium 13. A pressure differential, e.g., positive pressure or vacuum, is exerted on the article as it travels between rollers 10 and 11 to expand it. When the expanded article leaves heating medium 13, it is quenched by a suitable cooling die 14 and is then collected on a suitable means such as a roller.

EXAMPLE

Using the type of extrusion apparatus illustrated in FIG. 1, a relatively infusible outer portion comprising 59.85% high density (melt index 0.6) polyethylene (Hifax 1400E, manufactured by Hercules Powder Company) 19.40% intermediate density (melt index 1.0) polyethylene (Spencer 2504, manufactured by Spencer Chemical Company), 7% antimony oxide, 2.4% triallyl cyanurate, 0.4% $PbO.PbC_2.H_2(COO)_2.2H_2O$ (Lector 78, manufactured by National Lead Company), 0.8% 4, 4'-thiobis-(6-tert-butyl-m-cresol), 0.2% petrolatum, 0.1% finely divided silica (Cab-O-Sil, manufactured by Godfrey L. Cabot, Inc.), and 9.85% tetrabromophthalic anydride were compound extruded with a relatively fusible inner portion comprising 38.5 pounds low density (melt index 22) polyethylene (Alathon 17, manufactured by E. I. duPont de Nemours Company), 8.46 pounds low density (melt index 200+30) polyethylene (Tenite 812, manufactured by Eastman Chemical Products, Incorporated), 2.5 pounds antimony oxide and 0.5 pounds 4, 4'-thiobis-(6-tert-butyl-m-cresol) to form an essentially homogeneous tubular article. This article has an inside diameter of about 0.041 inches, a relatively fusible portion wall thickness of about 0.039 inches and a relatively infusible wall thickness of about 0.078 inches. The tubular article was then irradiated using a 2 mev electron accelerator to a dose of 10 megarads. The irradiated tube was then expanded according to the process described in U.S. Pat. No. 3,086,242, in a bath having a temperature of about 340° F. which resulted in a dimensional increase to an inside diameter of about 0.33 inches. A pressure differential of 10 psi on the inside of the tube and 8 psi on the outside of the tube was applied and the speed of travel was 5 ft. per minute. The inside diameter of the apertured plug through which the tube left the bath was 0.250 inches and that of the cooling die was 0.422 inches.

The 4, 4' thiobis-(6-tert-butyl-m-cresol) is employed in the relatively infusible portion as an anti-oxidant. Although this material is an antirad, it is present in such low concentration that it does not substantially hinder the cross-linking of the relatively infusible portion.

It will be apparent to those skilled in the art that the article produced according to the present invention may be formed into a variety of shapes and may be used for virtually any covering, laminating, or uniting purpose. It is to be understood that the article of the present invention may be formed such that it will expand or contract upon the application of heat. Thus, by forming the relatively fusible portion of the article of the present invention as the outer surface of a tubular member and the relatively infusible member as the inner surface thereof, the article of the present invention may be used to line tubular conduits such as pipes.

Among the numerous and varied uses to which the article of the present invention may be put are the joining of two or more pieces of metal, and/or plastic, joining two or more pieces of tubing or rod combinations thereof, the application of casters to chair legs, the sealing of bottle caps or covers on other containers, forming moisture-resistant coverings on one or more objects, forming a chemically resistant covering for one or more objects and lamination in general. Furthermore, the article of the present invention may be used for splicing, encapsulating, etc., electrical elements.

Although the foregoing description has emphasized compound extrusion, it is to be understood that the article of the present invention may be produced by other suitable processes such as molding. In all cases, it is, of course, required that the materials used be capable of forming an essentially integral article. However, it is to be understood that it is within the scope of the present invention to add reinforcing material to the relatively infusible portion, the relatively fusible portion, or both. It is also to be understood that the relatively fusible portion of the article of the present invention may possess the property of elastic memory. For example, when the article of the present invention is exposed to radiation before it is expanded, it is not unusual to find that the relatively fusible portion of the final product possesses a certain amount of elastic memory.

As used herein, the term "relatively infusible portion" means that this portion does not become substantially fluid at a temperature sufficient to render the "relatively fusible portion" substantially fluid.

Having fully described the present invention, it is to be understood that it is not to be limited to the specific details set forth, but is of the full scope of the appended claims.

I claim:

1. A monolithic tubular article comprising an outer and an inner concentric tubular wall portion, said concentric wall portions being intimately bonded with each other, said intimate bond having been formed by fusing said wall portions together or by forming a chemical bond between said wall portions, one of said tubular portions comprising a heat-recoverable polymeric material being infusible at the temperature of heat-recoverability, the other said portion comprising a polymeric material fusible at the temperature of heat-recoverability.

2. The article of claim 1 wherein the outer wall portion is heat-recoverable.

3. The article of claim 1 wherein both the polymer comprising the inner wall portion and the polymer comprising the outer wall portion have repeating units that are the same repeating units, the polymer comprising said inner wall portion having a molecular weight substantially less than the molecular weight of the polymer comprising said outer wall portion, and the outer wall portion having been cross-linked by high energy irradiation.

4. The article of claim 1 wherein the outer wall portion is heat-recoverable and has been cross-linked by high energy irradiation and the inner wall portion has been exposed to irradiation and contains substantially no cross-links between polymer molecules.

5. The article of claim 1 wherein the outer wall portion is cross-linked polyethylene and the inner wall portion is polyisobutylene which has been subjected to high energy irradiation.

6. The article of claim 1 wherein the outer portion comprises cross-linked polyethylene and the inner portion comprises a polymer containing a product of the interaction between an antirad and high energy irradiation.

7. The article of claim 1 wherein said relatively infusible portion has been cross-linked by high energy irradiation.

8. The article of claim 1 wherein said relatively infusible portion has been cross-linked by chemical means.

9. The article of claim 1 wherein the fusible portion contains an antirad.

10. The article of claim 9 wherein the antirad is selected from the group consisting of 4, 4' -thiobis-(6-tert-butyl-m-cresol); 4, 4' methylene-bis-(2-tert-butylphenol); 2-6, ditert-butylphenol; 4, 4' butylidenebis-(6-tert-butyl-m-cresol); 2, 5-di (t-amyl) hydroquinone, pentabromophenol, naphthylene and copper stearate.

11. The article of claim 1 wherein the outer tubular wall is relatively infusible and comprises a cross-linked polymer selected from the group consisting of polyethylene, polypropylene, nylon, fluorinated ethylene propylene, polyvinyl chloride and polyvinylidene fluoride.

12. An integral monolithic tubular article comprising an outer and an inner concentric tubular wall portion, said outer portion comprising polyethylene having a melt index of about 0.3 or lower and said inner portion comprising polyethylene having a melt indes of about 20 or higher, said concentric wall portions being intimately bonded with each other, said intimate bond having been formed by fusing said wall portions together or by forming a chemical bond between said wall portions, the outer tubular portion being cross-linked and having been deformed from an initial heat-stable configuration to a heat-unstable configuration on the application of heat alone, the outer portion being infusible at the temperature at which it returns to its initial configuration, the inner portion being fusible at said temperature.

13. An integral monolithic tubular article comprising an outer and an inner concentric tubular wall portion, said concentric wall portions being intimately bonded with each other, said intimate bond having been formed by fusing said wall portions together or by forming a chemical bond between said wall portions, the outer tubular portion being cross-linked and having been deformed from an initial heat-stable configuration to a heat-unstable configuration and being capable of returning to or toward the initial configuration on the application of heat alone, the outer portion being infusible at the temperature at which it returns to its initial configuration, the inner portion being fusible at said temperature.

* * * * *